July 12, 1927.
F. S. BASTER
1,635,304
VALVE GEARING
Filed Dec. 15, 1924
2 Sheets-Sheet 2
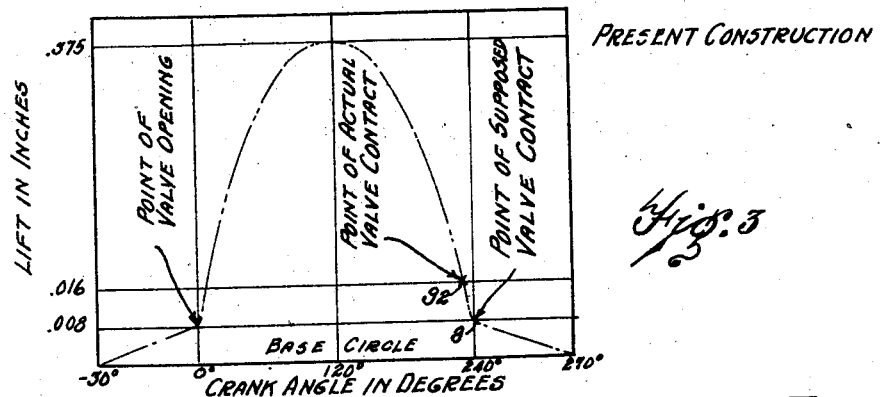
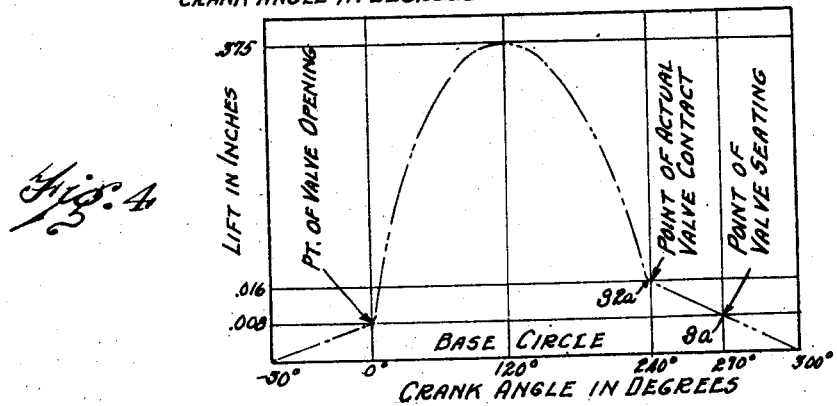
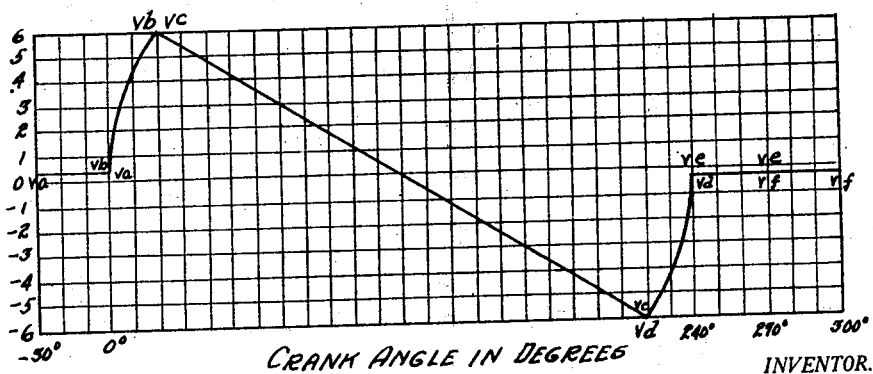
INVENTOR.
Forrest S. Baster
BY
ATTORNEY.

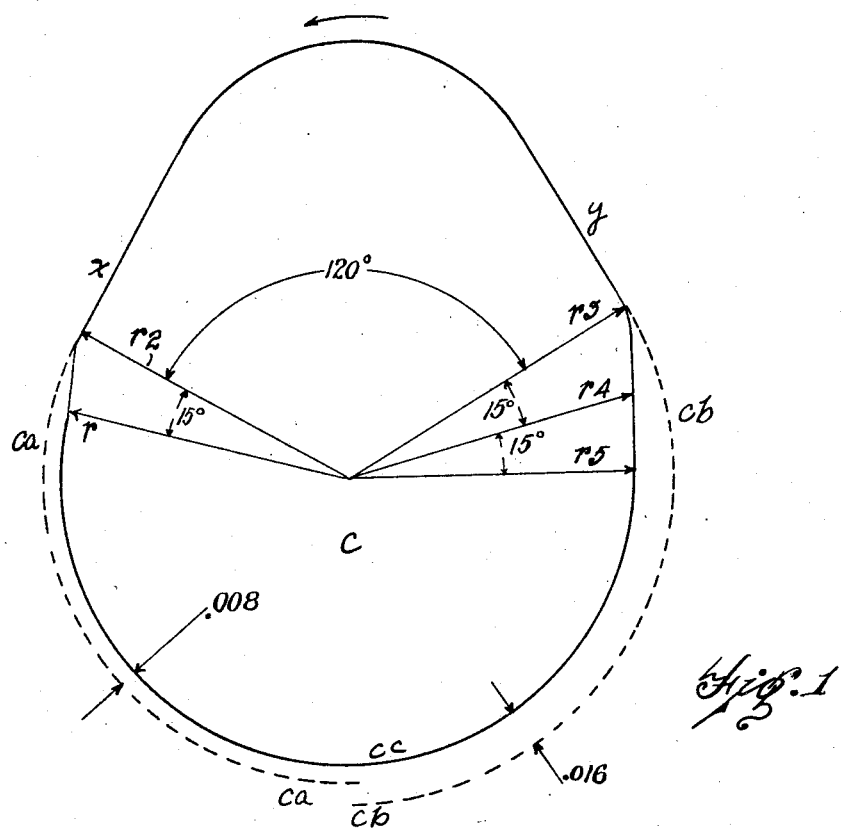

Patented July 12, 1927.

1,635,304

UNITED STATES PATENT OFFICE.

FOREST S. BASTER, OF DETROIT, MICHIGAN.

VALVE GEARING.

Application filed December 15, 1924. Serial No. 755,882.

My invention relates to a valve gearing for automobile engines and an object of my improvements is to provide an apparatus that shall be noiseless under all conditions.

In automobile engine practice, a great variety of speeds obtain and the temperature of the parts varies and it is found that the valve mechanism makes a noise under some conditions and not under others, and the functioning of the engine at some speeds as compared with others, shows a casual effect due to some cause that has not been heretofore specifically and certainly ascertained.

I have observed that a noise occurs under some conditions just before the valve is normally located upon its seat and it is an object of my invention to obviate this noise.

To further describe my invention so that others can practice the same without fail from such directions, it is necessary for me to illustrate and describe some defects in existing structures that I have discovered that make the valve gearing noisy in operation.

In the accompanying drawings:

Figure 1 is a face view of a cam for actuating the valve, which cam embodies my invention.

Figure 2 is a velocity diagram of the tappet actuated by the cam of Figure 1 assuming that it is always in contact with the cam and of the valve, when it is in contact with the tappet.

The constituent points of the lines represent by their respective positions the velocities and the slope or direction of the lines represent accelerations. Velocities in rising are taken as positive and is descending as negative. The angular scale of the base line indicates degrees of the crank angle.

Figure 3 is a diagram illustrating the operation of valve gearing as at present constructed, and Figure 4 is a similar diagram to that of Figure 3 showing how the defect illustrated in Figure 3 is obviated by my invention.

C, is the cam. $ca$, is a broken line indicating the contour of the circular part of the cam which would just hold the valve actuating parts in contact previous to the lifting of the valve, and $cb$, is a similar broken line indicating the contour of the circular part of the cam that would hold the valve actuating parts at rest at a point during the closing operation of the valve at which I have observed that a knock and noise sometimes occur. $c, c,$ is the actual circular contour of the cam after being cut away to allow for the required clearance between the valve and its actuating part. The faces $x$ and $y$ of the cam C, are approximately tangent respectively to the circles $ca$ and $cb$.

$r, r^2$, are bounding radii to an angle through which the cam turns during the time that its surface or edge is adapted to actuate the valve actuating parts at a constant small velocity so that they shall engage said valve without any perceptible noise. Beyond the radius $r^2$ the cam is formed to raise and lower the valve, as indicated in the diagram of Figure 2, in which a substantially constant velocity of the tappet is illustrated by the line $va$—$va$ and a rapid acceleration of the tappet and valve by the line $vb$—$vb$ and a deceleration of the tappet and valve by the line $vc$—$vc$, and the line $vd$—$vd$ illustrates a decrease of the negative velocity value of the tappet and valve. At the termination of the action illustrated by the last named line, the operative cam surface is at the radius $r^3$; from this point the cam surface is formed to cause a practically constant negative velocity of the tappet and valve illustrated by the line $ve$—$ve$ to the radius $r^4$ and the velocity of the tappet by the line $vf$—$vf$ to the radius $r^5$.

In this way, I provide for engaging the valve at so low a relative velocity that no noise is made and I provide so low a velocity for the valve at the radius $r^3$ that the noise generally observed at this point is obviated and the valve is brought to rest normally upon its seat at the radius $r^4$ at so low a velocity that no noise occurs.

This action is more distinctly illustrated in Figures 3 and 4. The point marked, "Point of actual valve contact" Figure 4, corresponds to the angular cam position of radius $r^3$ (Fig. 1) and the point marked "Point of valve seating" (Fig. 4) corresponds to the radius $r^4$ (Fig. 1).

I have observed that a knock or noise occurs at the point marked point of "Actual valve contact" ($g^2$ Figure 3) in conventional constructions of valve gearing and that in such constructions the point marked "Point of supposed valve contact ($g$)" is not in fact always correct, therefore a noise occurs at the point $g^2$. I have therefore provided for a slow movement of the valve preceding the point marked "Point of valve seating," ($ga$ Figure 4) or in other words a slow movement of the valve is provided at the point of "Actual valve contact," ($g^{2a}$ Figure 4) and continuously between these two points (line $ve$—$ve$ Figure 2).

It is to be observed (assuming the same valve clearance) that the point marked "Point of actual valve contact," ($g^2$ Figure 3 and $g^{2a}$ Figure 4) occurs at the same distance from the base circle (.016 inch in this instance) but does not necessarily occur at the same angular position of the cam. It is further to be observed that should these two points ($g^2$ Figure 3 and $g^{2a}$ Figure 4) occur at the same angular cam position then, under no condition, could the point marked "Point of supposed valve contact" ($g$ Figure 3) and the point marked "Point of valve seating" ($ga$ Figure 4) occur at the same angular cam position. This is due to the slow movement of the valve in my construction preceding the point marked "Point of valve seating."

In specifying a cam to be made the shape is, in part, conventionally defined by the distance the cam will move its follower when turning through a given angle.

But the cam form may also be specified by the polar co-ordinates of its peripheral line.

According to the first method it may be said that a cam is so shaped as to be adapted to give a slow motion to its follower when it is opening and when it is closing the valve.

According to the second method one would say the successive radii vectors vary but little in length at the two end portions of the cam outline that acts on the follower.

What I claim is:—

1. The combination with an internal-combustion engine poppet valve of an actuating cam therefor having a contour as described, so constructed as to effect a slow return motion of the valve actuating parts from a position materially higher than that at which the valve seats.

2. The combination with an internal-combustion engine poppet valve of an actuating cam therefor having a contour as described that shall effect a slow return motion of the valve actuating parts from a materially higher point than the point at which the cam commences to actuate said parts to open the valve.

3. The combination with an internal-combustion engine poppet valve of an actuating cam therefor having an active outline, including at each end portions of slight variation, the said portion of slight variation on the descending side merging with said outline at a greater distance from the cam axis than on the ascending side.

In testimony whereof, I sign this specification.

FOREST S. BASTER.